US008198810B2

(12) United States Patent
Lim et al.

(10) Patent No.: US 8,198,810 B2
(45) Date of Patent: Jun. 12, 2012

(54) METHOD OF MANUFACTURING ELECTROMAGNETIC INTERFERENCE (EMI) SHIELDING FILTER FOR PLASMA DISPLAY PANEL AND EMI SHIELDING FILTER FOR PLASMA DISPLAY PANEL USING THE SAME

(75) Inventors: Jaeseok Lim, Suwon-si (KR); Sangyoung Jin, Suwon-si (KR); Minhyung Kim, Suwon-si (KR); Heeyoul Yoon, Suwon-si (KR); Ria Ju, Suwon-si (KR); Younghak Pyo, Suwon-si (KR); Seunghyuck Paek, Suwon-si (KR); Sangchul Seo, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 229 days.

(21) Appl. No.: 12/630,832

(22) Filed: Dec. 3, 2009

(65) Prior Publication Data

US 2010/0164354 A1 Jul. 1, 2010

Related U.S. Application Data

(60) Provisional application No. 61/142,057, filed on Dec. 31, 2008.

(51) Int. Cl.
*H01J 17/49* (2012.01)
*G02F 1/1333* (2006.01)

(52) U.S. Cl. ........ 313/582; 313/584; 313/585; 313/586; 313/587; 315/169.1; 315/169.4; 428/441

(58) Field of Classification Search .......... 313/581–587; 345/37, 41, 60, 71; 315/169.1, 169.4; 428/77, 428/441, 261
See application file for complete search history.

(56) References Cited

U.S. PATENT DOCUMENTS

| | | | | |
|---|---|---|---|---|
| 6,255,778 | B1 * | 7/2001 | Yoshikawa et al. | 313/582 |
| 2005/0178569 | A1 * | 8/2005 | Kotsubo | 174/35 MS |
| 2007/0128855 | A1 | 6/2007 | Cho et al. | |
| 2007/0181326 | A1 * | 8/2007 | Naito et al. | 174/36 |
| 2007/0190252 | A1 * | 8/2007 | Iwata | 427/258 |
| 2008/0102390 | A1 * | 5/2008 | Inagaki et al. | 430/66 |
| 2008/0124490 | A1 * | 5/2008 | Kobayashi | 427/597 |
| 2008/0302981 | A1 * | 12/2008 | Matsumura et al. | 250/515.1 |

(Continued)

FOREIGN PATENT DOCUMENTS

EP 1 109 434 A2 6/2001

(Continued)

OTHER PUBLICATIONS

Japanese Patent application publication 2007-294355,Nov. 2007,machine translation.*

(Continued)

*Primary Examiner* — Tracie Y Green

(74) *Attorney, Agent, or Firm* — Christie, Parker & Hale, LLP

(57) ABSTRACT

A method of manufacturing an electromagnetic wave shield for a plasma display panel having a first panel having an image-displaying surface, the method including coating the image-displaying surface of the first panel with a coating solution to form a hydrophobic layer; applying a conductive ink to the hydrophobic layer utilizing an ink-jet applicator to form a pattern of the conductive ink; and heating the conductive ink and the hydrophobic layer to form a conductive mesh pattern on the hydrophobic layer.

20 Claims, 4 Drawing Sheets

U.S. PATENT DOCUMENTS

| | | | | |
|---|---|---|---|---|
| 2009/0053507 A1* | 2/2009 | Hoey et al. | .................... | 428/323 |

FOREIGN PATENT DOCUMENTS

| | | | |
|---|---|---|---|
| JP | 2003-297567 | A | 10/2003 |
| JP | 2007-294355 | A | 11/2007 |
| JP | 2008-000733 | | 1/2008 |
| KR | 10-2004-0009050 | A | 1/2004 |
| KR | 2004-0009050 | | 1/2004 |
| KR | 10-2005-0044131 | A | 5/2005 |
| KR | 2005-0044131 | | 5/2005 |
| KR | 10-2006-0086747 | A | 8/2006 |
| KR | 2006-0086747 | | 8/2006 |
| KR | 10-2008-0082912 | A | 9/2008 |
| KR | 2008-0082912 | | 9/2008 |
| WO | WO 2008/111757 | A1 | 9/2008 |

OTHER PUBLICATIONS

KIPO Office action dated Mar. 28, 2011, for corresponding Korean Patent application 10-2009-0122089, noting reference previously submitted in an IDS.

English machine translation of Japanese Publication 2007-294355, dated Nov. 6, 2007, previously submitted in an IDS dated Jul. 27, 2010.

European Search Report dated Mar. 23, 2010 issued to corresponding European application No. EP 09179403, listing the cited references in this IDS.

* cited by examiner

METHOD OF MANUFACTURING ELECTROMAGNETIC INTERFERENCE (EMI) SHIELDING FILTER FOR PLASMA DISPLAY PANEL AND EMI SHIELDING FILTER FOR PLASMA DISPLAY PANEL USING THE SAME

CROSS-REFERENCE TO RELATED APPLICATION

This application claims priority to and the benefit of U.S. Provisional Patent Application No. 61/142,057, filed Dec. 31, 2008, the entire content of which is incorporated herein by reference.

BACKGROUND OF THE INVENTION

1. Field of the Invention

An aspect of the present invention relates to a method of manufacturing an electromagnetic interference (EMI) shielding filter for a plasma display panel and an EMI shielding filter for plasma display panel using the same.

2. Description of the Related Art

A plasma display device often includes a plasma display panel having a discharge cell defined by an address electrode, a scan electrode and a sustain electrode, and phosphors being applied to the discharge cell; and a drive unit for driving the plasma display panel. The plasma display device displays images through the generation of visible rays in response to excitation of phosphors by the action of ultraviolet rays generated upon gas discharge.

Plasma display devices often suffer from high-level generation of electromagnetic waves in the plasma display panel during a driving process thereof. For this reason, a plasma display device may be fabricated with a separate electromagnetic interference (EMI) shielding fitter for blocking electromagnetic waves to the front or display side of the plasma display panel.

Alternatively, the EMI shielding filter is fabricated by the formation of a transparent conductive layer on a separate base such as film or glass substrate. However, such a transparent conductive layer and separate base such as film or glass substrate increase production costs of plasma display devices.

SUMMARY OF THE INVENTION

Aspects of the present invention provide a method of manufacturing an electromagnetic interference (EMI) shielding filter for a plasma display panel and an EMI shielding filter for plasma display panel using the same which are capable of simplifying production processes and reducing production costs in conjunction with the size reduction of a plasma display device including the plasma display panel through the formation of an EMI shielding fitter including a hydrophobic layer and a conductive mesh pattern directly on a plasma display panel by means of an ink-jet method using conductive ink.

In one embodiment, a method of manufacturing an electromagnetic wave shield for a plasma display panel having a first panel having an image-displaying surface is provided, the method including coating the image-displaying surface of the first panel with a coating solution to form a hydrophobic layer, applying a conductive ink to the hydrophobic layer utilizing an ink-jet applicator to form a pattern of the conductive ink; and heating the conductive ink and the hydrophobic layer to form a conductive mesh pattern on the hydrophobic layer.

In one embodiment, the hydrophobic layer includes fluoroalkylsilane, which may be a mixture of trichloro(3,3,3-trifluoropropyl)silane and trichloro(1H,1H,2H,2H-perfluorooctyl)silane. In one embodiment, the fluoroalkylsilane further includes 3-aminopropyl triethoxy silane and/or 3-mercaptopropyl triethoxy silane. In one embodiment, the fluoroalkylsilane is diluted to a concentration of between about 0.05M and about 0.3 M in n-octane before being coated on the image-display surface.

In one embodiment, the conductive ink includes silver nano-ink, which may be a dispersion of silver nano-particles in n-tetradecane. In one embodiment, a diameter of the silver nano-particles is between about 5 nm and about 100 nm, and the silver nano-ink may include silver nano-particles between about 50% and about 90% by weight.

In one embodiment, the conductive mesh pattern is a tetragonal conductive mesh pattern having a pitch of between about 200 μm and about 400 μm. Further, forming the conductive mesh pattern may include spraying ink drops of the conductive ink through a plurality of nozzles of the ink-jet applicator. In one embodiment, each of the ink drops has a volume of between about 3 pL and about 150 pL.

In one embodiment, the heating step includes heating the conductive mesh pattern and the hydrophobic layer to a threshold temperature to remove organic materials from the conductive mesh pattern, and that temperature may be between about 250° C. and about 400° C. Further, in one embodiment, the conductive mesh pattern includes a plurality of conductive lines of the conductive ink, wherein a ratio of a thickest portion to a thinnest portion of each of the plurality of conductive lines is between about 1.0:0.6 to about 1.0:0.9.

In one embodiment, a display panel for a plasma display device is provided, the display panel including an image displaying surface and an electromagnetic wave shield directly on the image displaying surface, the electromagnetic wave shield including a hydrophobic layer on the image displaying surface and a conductive mesh pattern on the hydrophobic layer.

In one embodiment, the hydrophobic layer includes fluouralkylsilane and the conductive mesh pattern includes silver nano-particles. Further, the conductive mesh pattern may have a pitch of between about 200 μm and about 400 μm. Further, the conductive mesh pattern: has a line width of 30 μm to 70 μm; and/or has a mesh surface resistance of 0.05 Ω/square to 0.4 Ω/square; and/or is formed of a plurality of conductive lines with a line width of repeated thick and thin portions with an average ration of the thickest portion to the thinnest portion of each of the plurality of conductive lines between 1.0:0.6 and 1.0:0.9.

DETAILED DESCRIPTION

Figure 1:
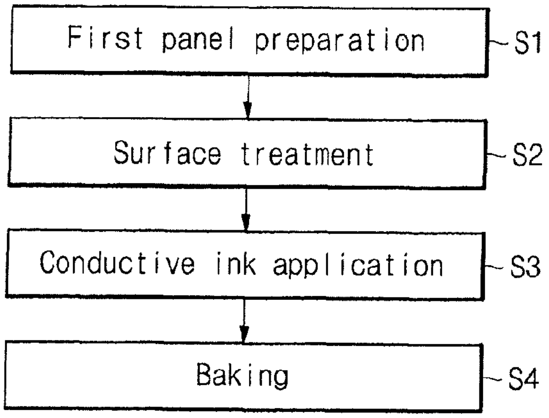
FIG. 1 is a flow chart illustrating a method of manufacturing an electromagnetic interference (EMI) shielding filter for a plasma display panel in accordance with one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

FIG. 1 is a flow chart illustrating a method of manufacturing an electromagnetic interference (EMI) shielding filter (i.e., an electromagnetic wave shield) for a plasma display panel in accordance with one embodiment of the present invention, and FIGS. 2*a* through 2*d* are perspective views illustrating a method of manufacturing an electromagnetic interference (EMI) shielding filter for a plasma display panel in accordance with one embodiment of the present invention.

Referring to FIG. 1, the method of manufacturing the plasma display device in accordance with one embodiment of the present invention includes a first panel preparation step (S1), a surface treatment step (S2), a conductive ink application step (S3) and a baking step (S4).

Figure 2A:
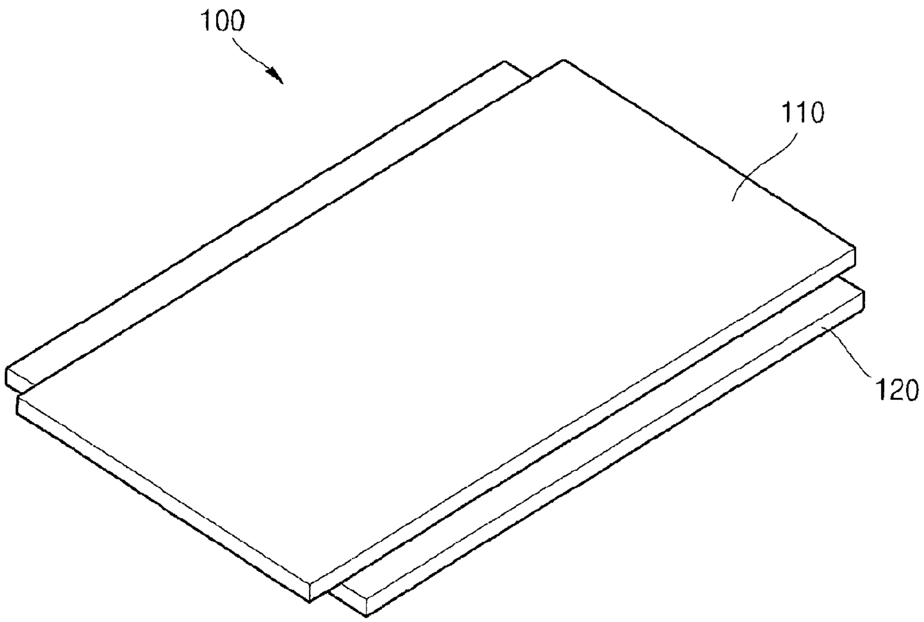
FIG. 2*a* is a perspective view of an embodiment of a panel of the present invention before the EMI shielding filter has been applied to the panel.

First, referring to FIG. 2*a*, the first panel preparation step (S1) is a step of preparing a first panel 110.

The first panel 110 displays images and includes display electrodes to apply a voltage necessary for gas discharge of the plasma display device, and a dielectric layer formed on a surface opposite to an image-displaying or first surface of the first panel 110, that is, a surface facing a second panel 120. Although the panel 100 is shown in FIG. 1 as a combined form of the first panel 110 with the second panel 120, the first panel 110 alone may be prepared without being combined with the second panel 120.

The second panel 120 includes address electrodes (not shown) adapted to apply a voltage necessary for gas discharge of the plasma display device and formed on a surface facing the first panel 110. The second panel 120 may further include an isolation wall, phosphors, a dielectric, and a protection film provided on the surface where the address electrodes were formed.

Figure 2B:
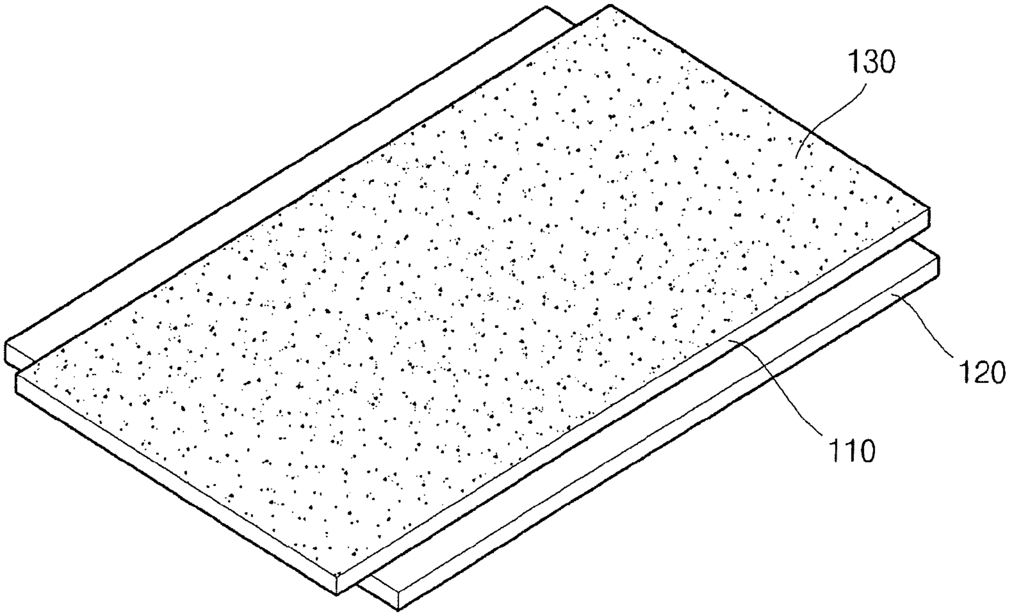
FIG. 2*b* is a perspective view of the panel of FIG. 1 after a hydrophobic layer or surface treatment has been applied to the panel.

Referring now to FIG. 2*b*, the surface treatment step (S2) is a step of forming a hydrophobic layer 130 by applying a coating solution to the entirety of a second surface of the first panel 110, that is, the surface not facing to the second panel 120.

The surface treatment step (S2) may employ fluoroalkylsilane (FAS) as a coating solution. The fluoroalkylsilane is applied to the entire surface of the first panel 110 by a conventional method, e.g. printing or spin coating. In one embodiment, the fluoroalkylsilane is a mixture of trichloro(3,3,3-trifluoropropyl)silane and trichloro(1H,1H,2H,2H-perfluorooctyl)silane. In one embodiment, the ratio of volumes of the mixture of trichloro(3,3,3-trifluoropropyl)silane and trichloro(1H,1H,2H,2H-perfluorooctyl)silane is between about 100:1 to about 20:1, and in one embodiment may be about 60:1. If the ratio of the volumes is greater than 100:1, a hydrophobic effect of the FAS may be insufficient and if the ratio is less than 20:1, the hydrophobic effect of the FAS may be excessive. However, it will be appreciated that if a different type of conductive ink is used for the EMI shielding fitter, as described in more detail below, the volume ratios of the mixture may be different.

In one embodiment, the concentration of FAS is between about 0.05M and about 0.3M in n-octane, and in one embodiment, the concentration may be about 0.1M. If the concentration is less than about 0.05M, a hydrophobic effect of the FAS may be insufficient and if the concentration is greater than about 0.3M, excess FAS may be used.

The hydrophobic layer 130 formed of FAS serves to control running and spreading of conductive ink on the surface of the first panel 110 to prevent excessive running and spreading which may occur upon application of the conductive ink in the subsequent conductive ink application step (S3).

When the hydrophobic layer 130 is formed of fluoroalkylsilane including only trichloro(3,3,3-trifluoropropyl)silane without trichloro(1H,1H,2H,2H-perfluorooctyl)silane, spreadability of the conductive ink on the hydrophobic layer 130 is increased upon application of the conductive ink in the subsequent conductive ink application step (S3). As a result, it is difficult to form a conductive mesh pattern having a fine line-width of less than 100 μm on the hydrophobic layer 130. On the other hand, when the hydrophobic layer 130 is formed of the fluoroalkylsilane including only of trichloro(1H,1H,2H,2H-perfluorooctyl)silane without trichloro(3,3,3-trifluoropropyl)silane, water repellency of the conductive ink on the hydrophobic layer 130 becomes excessively strong upon application of the conductive ink in the subsequent conductive ink application step (S3). As a consequence, when the formation of a line on the hydrophobic layer 130 is desired by connecting a plurality of ink drops, it is difficult to produce a complete line of connected ink drops.

In alternate embodiments, the FAS may be mixed with another compound such as 3-aminopropyl triethoxy silane and/or 3-mercaptopropyl triethoxy silane to be used as a surface treatment agent.

Figure 2C:
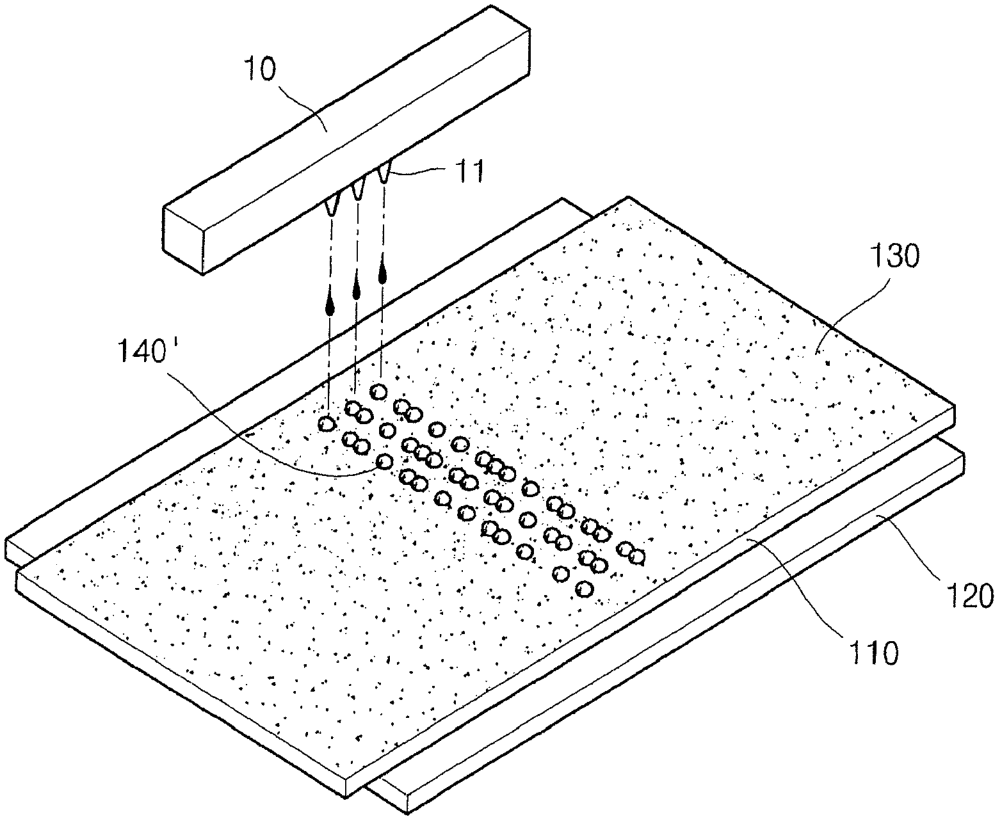
FIG. 2*c* is a perspective view of a conductive ink being applied to the panel of FIG. 1.

Referring to FIG. 2*c*, the conductive ink application step (S3) is a step of forming a conductive mesh pattern (140 of FIG. 2*d*) by applying the conductive ink to the hydrophobic layer 130.

The conductive ink application step (S3) may employ a silver nano ink as a conductive ink. The silver nano-ink may be a dispersion of silver nano-particles having a particle diameter of about 5 nm to about 100 nm in n-tetradecane. If a particle diameter of the silver nano-particles is less than about 5 nm, this may result in non-uniform dispersion of the silver nano-particles. On the other hand, if a particle diameter of the silver nano-particles is larger than about 100 nm, this may result in plugging of flow paths of the silver nano-ink in a plurality of nozzles 11 of an ink-jet applicator 10. As will be appreciated, the conductive ink does not have to be a silver nano-ink, but rather may be other types of conductive ink including other materials such as copper.

A content of the silver nano-particles may be in the range of about 50 wt % to about 90 wt % in the silver nano-ink, and the silver nano-ink may further include trace amounts of organic dispersant and inorganic frit in order to improve dispersibility and viscosity thereof. If a content of the silver nano-particles is less than about 50 wt % of the silver nano-ink, this may lead to deterioration of electrical properties of the silver nano-ink. On the other hand, if a content of the silver nano-particles is greater than about 90 wt % of the silver nano-ink, a content of the organic dispersant and inorganic frit in the silver nano-ink is decreased to thereby result in less improvement of the dispersibility and viscosity of the silver nano-ink.

The conductive ink application step (S3) includes application of the silver nano-ink to the hydrophobic layer 130 in an ink-jet manner using the ink-jet applicator 10, thus forming a conductive mesh pattern 140 where individual ink drops 140' are connected to one another. The conductive mesh pattern 140 has a line width with repeated thick and thin portions due to intrinsic nature of ink-jet application. A thickness variation of a line formed by conductive ink drops can be controlled by varying the distance between each ink drop. In one embodiment, an average ratio of thickest portion of the line to the thinnest portion of the line is between about 1.0:0.6 and about 1.0:09, and in one embodiment the ratio is 1.0:0.7. If the distance between each ink drop is too large, the sheet resistance may increase thereby degrading the shield performance. If the distance is too small, too much ink may be used to form the line.

Figure 2D:
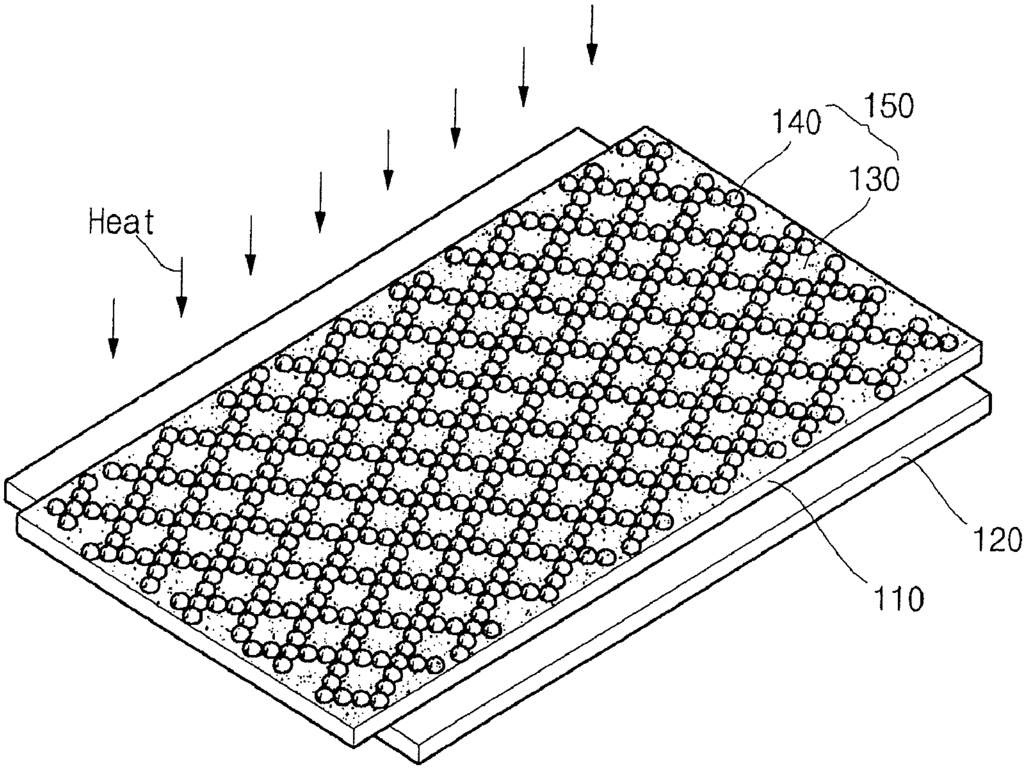
FIG. 2*d* is a perspective of the panel of FIG. 1 coated with the conductive ink being heated.

The conductive mesh pattern 140 is electrically connected to a ground of the plasma display device such that electromagnetic waves coming from the plasma display panel 100 are grounded to the ground of the plasma display device, thus shielding electromagnetic wave interference. For the further understanding, FIG. 2*c* shows the state prior to complete formation of the conductive mesh pattern 140 on the hydrophobic layer 130, with the size of the ink drops 140' of the conductive mesh pattern 140 being exaggerated for clarity, whereas FIG. 2*d* shows complete formation of the conductive mesh pattern 140.

In one embodiment, the conductive mesh pattern 140 in the present application is formed on an outside surface of the first panel 110 of the panel 100. It is desirable in one embodiment to have the conductive mesh pattern 140 formed after fabrication of the panel 100 because as the first panel 110 and second panel 120 are moved through the production line, the conductive mesh pattern 140 can be damaged if formed prior to the fabrication of the panel 100. In other embodiments, the conductive mesh pattern 140 can be formed on the first panel 1140 prior to the fabrication of the panel 100.

Further, the conductive ink application step S3 can apply the conductive ink to design and form a tetragonal conductive mesh pattern (FIG. 2*d*) having a pitch of about 200 μm to about 400 μm. As used herein, "pitch" refers to the distance between two adjacent parallel lines that form the conductive mesh pattern. If a pitch of the conductive mesh pattern 140 is less than about 200 μm, a pitch of the conductive mesh pattern 140 becomes excessively dense to thereby lower light transmittance of the plasma display panel 100. On the other hand, if a pitch of the conductive mesh pattern 140 is higher than about 400 μm, an area of the conductive mesh pattern 140 occupied in the plasma display panel 100 is decreased to result in poor electromagnetic interference shielding efficiency of the plasma display panel 100.

In one embodiment, the conductive ink application step (S3) is performed in a manner that individual ink drops 140' being sprayed through multiple nozzles 11 of the ink-jet applicator 10 have a volume of about 3 pL to about 30 pL. If a volume of the individual ink drops 140' is less than about 3 pL, a line width of the conductive mesh pattern 140 is excessively thin to lower electrical conductivity in the plasma display panel 100. On the other hand, if a volume of the individual ink drops 140' is higher than about 30 pL, a line width of the conductive mesh pattern 140 is excessively thick to lower optical transmittance in the plasma display panel 100. In another embodiment, 12 pL is the upper limit for an ink drop volume. In still another embodiment, different sized ink drops may be used.

Table 1, below, illustrates various droplet volumes and the corresponding line widths and mesh surface resistances produced for each volume, wherein the pitch of the conductive mesh pattern is about 300 μm.

TABLE 1

| Droplet volume (pL) | Line width (μm) | Mesh surface resistance (Ω/square) |
|---|---|---|
| 3 | 32 | 0.4 |
| 4 | 34 | 0.33 |
| 8 | 40 | 0.20 |
| 20 | 60 | 0.11 |
| 30 | 70 | 0.05 |

As shown in Table 1, droplet volumes ranging from about 3 pL to about 30 pL produce line widths horn between about 32 μm to about 70 μm and mesh surface resistances down to about 0.05 Ω/square.

Referring to FIG. 2*d*, the baking step (S4) is a step of thermally baking the conductive mesh pattern 140 to be fixed on the hydrophobic layer 130.

Specifically, the baking step (S4) includes fixation of the conductive mesh pattern 140 to the hydrophobic layer 130 by removing organic materials contained in the conductive mesh pattern 140 using heat of between about 250° C. to about 400° C. In one embodiment, hot air may be used to bake the conductive mesh pattern 140. Once the conductive mesh pattern 140 has been heated to a suitable temperature, the silver nano-particles no longer exist in particle form, but the pattern remains as a conductive mesh pattern formed from silver.

If a baking temperature of the conductive mesh pattern 140 is lower than about 250° C., the organic materials are not thoroughly removed from the conductive mesh pattern 140, thus resulting in deterioration of the electrical conductivity. On the other hand, if a baking temperature of the conductive mesh pattern 140 is higher than about 400° C., this may cause damage to the plasma display panel 100.

In this manner, the EMI shielding filter 150 including the hydrophobic layer 130 and the conductive mesh pattern 140 can have a line width of the conductive mesh pattern 140 of about 40 μm, light transmittance of about 77%, sheet resistance of about 0.2 Ω/square, and a pencil hardness of about 6H in response to a pencil hardness test. Where it is applied to a plasma display device, the EMI shielding filter 150 meets the FCC EMI Class B.

As described above, the method of manufacturing an EMI shielding fitter for a plasma display panel in accordance with one embodiment of the present invention can form an EMI shielding filter 150 including the hydrophobic layer 130 and the conductive mesh pattern 140 directly on the plasma display panel 100 by means of an ink-jet method using conductive ink.

Therefore, the method of manufacturing an EMI shielding fitter for a plasma display panel in accordance with one embodiment of the present invention is capable of simplifying production processes and reducing production costs of a separate and additional base, as compared to fabrication of an EMI shielding filter through the formation of a conductive mesh pattern on a separate base by means of an etching process.

Further, the method of manufacturing an EMI shielding fitter for a plasma display panel in accordance with one embodiment of the present invention is capable of saving production costs of a separate base and an expensive transparent conductive layer, as compared to fabrication of an EMI shielding filter through the formation of an expensive transparent conductive layer on a separate base.

Further, the method of manufacturing an EMI shielding filter for a plasma display panel in accordance with one embodiment of the present invention is capable of reducing the size of a plasma display device with the plasma display panel, due to no need of any additional base material in the formation of the EMI shielding fitter.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method of manufacturing an electromagnetic wave shield for a plasma display panel comprising a first panel having an image-displaying surface, the method comprising:

coating the image-displaying surface of the first panel with a coating solution to form a hydrophobic layer;

applying a conductive ink to the hydrophobic layer utilizing an ink-jet applicator to form a pattern of the conductive ink; and heating the conductive ink and the hydrophobic layer to form a conductive mesh pattern on the hydrophobic layer, wherein the conductive mesh pattern comprises individual ink drops connected to one another.

2. The method of claim 1, wherein the coating solution comprises fluoroalkylsilane.

3. The method of claim 2, wherein the fluoroalkylsilane comprises a mixture of trichloro(3,3,3-trifluoropropyl)silane and trichloro(1H,1H,2H,2H-perfluorooctyl)silane.

4. The method of claim 3, wherein the fluoroalkylsilane further comprises 3-aminopropyl triethoxy silane and/or 3-mercaptopropyl triethoxy silane.

5. The method of claim 2, wherein the fluoroalkylsilane is diluted to a concentration of between about 0.05M and about 0.3M in n-octane before being coated on the image-display surface.

6. The method of claim 1, wherein the conductive ink comprises silver nano-ink.

7. The method of claim 6, wherein the silver nano-ink comprises silver nano-particles dispersed in n-tetradecane.

8. The method of claim 7, wherein a diameter of the silver nano-particles is between about 5 nm and about 100 nm.

9. The method of claim 7, wherein the silver nano-ink comprises silver nano-particles between about 50% and about 90% by weight.

10. The method of claim 1, wherein the conductive mesh pattern is a tetragonal conductive mesh pattern having a pitch of between about 200 μm and about 400 μm.

11. The method of claim 1, wherein forming the conductive mesh pattern comprises spraying ink drops of the conductive ink through a plurality of nozzles of the ink-jet applicator.

12. The method of claim 11, wherein each of the ink drops has a volume of between about 3 pL and about 30 pL.

13. The method of claim 1, wherein heating the conductive ink and the hydrophobic layer comprises heating the conductive mesh pattern and the hydrophobic layer to a threshold temperature to remove organic materials from the conductive ink.

14. The method of claim 1, wherein heating the conductive ink and the hydrophobic layer comprises heating the conductive ink and the hydrophobic layer to between about 250° C. and about 400° C.

15. The method of claim 1, wherein the conductive ink pattern comprises a plurality of conductive lines of the conductive ink and wherein a ratio of a thickest portion to a thinnest portion of each of the plurality of conductive lines is between about 1.0:0.6 to about 1.0:0.9.

16. A display panel for a plasma display device, the display panel comprising:

an image displaying surface; and an electromagnetic wave shield on the image displaying surface, the electromagnetic wave shield comprising:

a hydrophobic layer provided directly on the image displaying surface; and a conductive mesh pattern comprising a conductive ink provided directly on the hydrophobic layer.

17. The display panel of claim 16, wherein the hydrophobic layer comprises fluouralkylsilane.

18. The display panel of claim 16, wherein the conductive mesh pattern comprises silver nano-particles.

19. The display panel of claim 16, wherein the conductive mesh pattern has a pitch of between about 200 μm and about 400 μm.

20. The display panel of claim 16, wherein the conductive mesh pattern:

has a line width of 30 μm to 70 μm; and/or has a mesh surface resistance of 0.05 Ω/square to 0.4 Ω/square; and/or is formed of a plurality of conductive lines with a line width of repeated thick and thin portions with an average ration of the thickest portion to the thinnest portion of each of the plurality of conductive lines between 1.0:0.6 and 1.0:0.9.

* * * * *